Patented May 5, 1942

2,282,026

UNITED STATES PATENT OFFICE 2,282,026

TREATMENT OF POLYVINYL ACETAL RESINS

Bozetech C. Bren, Verona, and John H. Hopkins and George H. Wilder, Arlington, N. J., assignors to E. I. du Pont de Nemours & Company, Wilmington, Del., a corporation of Delaware No Drawing. Application April 29, 1939, Serial No. 270,740

12 Claims. (Cl. 260—73)

This invention relates to the treatment of polyvinyl acetal resins and, more particularly, to a method of purifying and stabilizing such resins whereby the clarity, color, and resistance of the resins to heat and light are all improved.

Polyvinyl acetal resins are resinous products prepared by condensing with aldehydes, in the presence of an acid catalyst, either all or part of the hydroxyl groups of polyvinyl alcohol or of an incompletely hydrolyzed polyvinyl ester.

The polyvinyl acetals are conventionally made by a process in which condensation of the aldehyde with the hydroxyl groups of the polyvinyl alcohol takes place in the presence of an acid catalyst; usually an organic solvent medium is employed and the acetals formed are recovered by precipitating them from the solvent medium through the addition of water. The finely divided crude resins obtained in this manner contain residues of the acid catalyst and residues of aldehydes which greatly impair their color and clarity and their resistance to light and heat.

In copending application Serial No. 270,741, filed of even date herewith, and entitled "Purification and stabilization of polyvinyl acetal resins," is disclosed a method of purifying and stabilizing crude polyvinyl acetal resins wherein the resin, in finely divided form, is steeped in a steeping liquid comprising water and a watermiscible solvent for the resin and an alkaline substance dissolved therein in a quantity to produce and maintain in the steeping liquid an apparent pH of at least 7.5, with active agitation at a temperature adapted to effect both softening and swelling of the resin in the steeping liquid but not agglomeration of the resin while the resin is subjected to agitation; thereafter, the resin is rinsed with water to remove solvent, the conditions of the rinsing being such that a residue of an alkaline substance is left associated with said resin in such amount that the resin will be in equilibrium with water of a pH between 7.5 and 9.0.

The above mentioned process, not known heretofore, does provide a practical method of purifying and stabilizing these crude resins by virtue of the fact that the alkaline substance in the steeping liquid neutralizes the acid catalyst residues and the combined water and resin solvent mixture soften and swell the resin particles and leach the residues of aldehyde therefrom, such residues being for the most part soluble in the solvent for the resin. The alkalinity of the steeping liquid also has the function of reducing the tendency of the particles of resin to agglomerate while the expedient of leaving the finished resin associated with a certain amount of alkaline substance improves the stability of the resin.

An object of the present invention is to provide another satisfactory and practical method of purifying and stabilizing crude polyvinyl acetal resins. A further object is to provide a method of obtaining polyvinyl acetal resins of greatly improved color and clarity and improved resistance to light and heat. Other objects of the invention will be apparent from the description given hereinafter.

The above objects are accomplished according to the present invention by steeping the crude polyvinyl acetal resin, in finely divided form, in a steeping liquid comprising essentially an aqueous solution of an alkaline substance, the quantity of said alkaline substance being sufficient to produce and maintain in the steeping liquid a pH of at least 7.5, under active agitation at a temperature adapted to effect softening of the resin in the steeping liquid without aggomeration of the resin while the resin is subjected to agitation, rinsing the resin with water, the conditions of the rinsing being such that a residue of an alkaline substance is left associated with the resin in such amount that the resin will be in equilibrium with water of a pH between 7.5 and 9.0, and thereafter drying the resin, the resin being subjected to the action of a water soluble aldehyde-binding reagent at some point during the steeping or rinsing when the resin is suspended in an aqueous vehicle having a pH of 7.5–11.0.

The process of the present invention would normally and most conveniently be applied to the crude polyvinyl acetal resin as precipitated from the organic solvent medium in which it is made. Conventionally, water is added to the reaction medium thereby effecting a precipitation of the resin in a finely divided state. The resin may be obtained in other ways, if desirable, but should be in a relatively finely divided state for the present purification and stabilization method to be effective.

The present invention primarily resides in the discovery that aldehyde-binding reagents such as urea, substituted ureas, and allied substances, are effective in combining with the aldehyde residues of crude polyvinyl acetal resins when they are brought into contact with such resins suspended in an aqueous vehicle having a pH between 7.5 and 11.0. The combination of the reagent and the aldehyde results in the formation of a compound which either is leached out by water or remains as an innocuous impurity in the resin and, in any event, eliminates the need for steeping the resin in a steeping liquid which contains a solvent for the resin.

Whereas in the process disclosed in the aforementioned application Serial No. 270,741 a steeping liquid is employed which causes a swelling of the reagent, due to the solvent for the resin in the steeping liquid, and accomplishes removal of the aldehyde residues by penetration of the resin solvent in the resin particles where it probably dissolves the aldehyde residues which are then leached out, the present process does not depend on swelling the resin particles through the action of a solvent for the resin and dissolving the aldehyde residues but, rather, on reacting the aldehyde residue with a reagent such as urea, or the like, to form compounds which either are readily washed out of the resin by water or remain as innocuous impurities in the compound.

The invention provides for the treatment of the resin with a steeping liquid adapted to effect neutralization or removal of undesirable acid catalyst residues as well as aldehyde residues and, at the same time, promotes the rapidity and thoroughness of the neutralization of the acid catalyst and removal of undesirable residues by facilitating the penetration of the resin by the liquid. These results are accomplished by the first step of the process of the invention wherein the resin, in finely divided condition—conveniently that resulting from a conventional precipitation from solution by water, is steeped in a steeping liquid composed chiefly of water in which, by suitable choice of temperature, the resin particles are caused to soften. The softening of the resin particles facilitates the penetration thereof by the constituents of the steeping liquid and thereby promotes the purifying and stabilizing effects thereof.

It is preferred that the treatment with the aldehyde-binding reagent be included in this step, i. e., that a suitable binding reagent be dissolved in the steeping liquid which already provides the alkaline conditions found requisite for the action of the aldehyde-binding reagent, and also the softening of the resin particles which promotes the action of the reagent.

The purifying and stabilizing action of such a steeping liquid so applied is the result of the removal and/or the conversion into harmless by-products of the residues of acid and of aldehyde. Residual acid within the resin is in part leached out by the water and in part neutralized by the alkaline substance. Residual excess aldehyde is in part leached out by the water and in part combined chemically with the aldehyde-binding reagent.

By the term "soften" as used herein with respect to the treatment of the resin particles in the steeping liquid is meant that the steeping liquid is maintained, as a minimum, at a temperature sufficient to cause the resin particles to soften and agglomerate in the absence of active agitation. It has been found, unexpectedly, that the alkaline substance in the steeping liquid not only functions to neutralize the acid catalyst residue in the resin but also reduces the tendency of the resin particles to agglomerate so that, when subjected to active agitation, the resin particles may be so softened, without danger of agglomeration, that the neutralizing action of the alkaline substance and the action of the aldehyde-binding reagent are promoted to an extraordinary degree.

The composition of the steeping liquid must be such that it contains sufficient alkaline substance to neutralize the acid residues in the resin and to maintain a pH in the liquid of at least 7.5 and not above 11.0, a pH of 9.0–11.0 being preferred, particularly in the early part of the treatment.

The alkaline substances most suitable for use in the steeping liquid are those sufficiently soluble and sufficiently dissociated in water and which are stable and substantially non-volatile at the temperature of the process and which do not give rise to by-products harmful to the quality or stability of the resin nor by action on the resin or by presence therein cause discoloration or other impairment of quality. Among the alkaline substances preferred for this purpose may be mentioned the alkali metal hydroxides and tertiary amines such as triethanol amine, diethyl cyclohexyl amine, dimethyl cyclohexyl amine. Ammonium hydroxide is not desirable because of its volatility and its effect on the color of the resin while alkaline earth hydroxides are undesirable because of their formation of insoluble salts with sulfuric acid which is commonly present in the resin as catalyst. The selection of alkaline substances not specifically disclosed herein but adapted for use in the steeping liquid will be a matter of no difficulty for those skilled in the art.

It will be understood that, while the present invention does not contemplate the deliberate addition of a solvent for the resin to the steeping liquid, the freshly precipitated crude resin may contain appreciable amounts of such solvent, depending on how thoroughly it has been washed after precipitation. Solvent introduced in the steeping liquid in this manner is not harmful but its effect on the softening of the resin and the tendency of the resin to agglomerate must be taken into consideration in determining the temperature at which the steeping liquid should be maintained. Manifestly, the conditions required to effect the desired softening of these resin particles will, in general, be milder as the content of solvent remaining in the particles is greater.

Upon the completion of the steeping treatment, it is preferred, although not essential, that the liquid containing the resin be heated long enough and at a sufficiently elevated temperature to complete the removal from the particles of resin of the residues of solvent which they may have carried from the original reaction batch. This is readily accomplished by heating the suspension of resin and liquid to a temperature in excess of the boiling point of the solvent. It has been found that this treatment is instrumental in reducing the tendency of the particles of resin to cake together later during the operation of drying.

The duration of contact of the resin with the steeping liquid must be sufficient to insure the desired stabilization. What the minimum time will be is influenced by the particle size of the resin, the particular steeping liquid employed, the temperature of the treatment, and the like. For a given set of conditions, the proper minimum duration of the treatment will be determined upon the basis of actual performance. To this end, samples of the slurry of resin and steeping liquid, containing about 25 grams of resin, are removed at suitable intervals and subjected to a rinsing treatment identical with that which is to be applied to the batch as a whole, then dried and subjected to a test for stability.

A convenient test for stability of the resin is to place about 2 grams of the finely divided dried resin upon a piece of glass and heat same at 125° C. in an oven supplied with air circulation. At the end of 4 hours, the heated sample is compared with the original unheated material. The stability is satisfactory if no change in color has resulted from the heating.

After the treatment in the steeping liquid, the resin is drained and repeatedly rinsed in water. This rinsing is so conducted as to leave associated with the resin, upon its separation from the last rinse water, a residue of alkaline substance. It has been observed that small proportions of an alkaline substance present in the resin particles at the conclusion of the rinse, and remaining therein during the drying, and thereafter, improve the stability of the resin, i. e., its resistance to light and heat. To provide that an alkaline substance shall be present at the conclusion of the rinsing requires either that the alkaline substance used in the steeping treatment be not completely removed from the resin by the subsequent rinses or else that an alkaline substance be introduced in one of the rinses, conveniently the last one. The presence of alkaline substance in adequate quantity is indicated if the pH of the final rinse water in contact with the resin remains steady at a value on the alkaline side, preferably between 7.5 and 9.0.

The alkaline substance to be used at this point will be selected upon the same general basis as that used in the steeping liquid in the first step of the process of the present invention. Since, however, any alkaline substance introduced at this point is definitely retained by the resin, whereas that used in the earlier wash may by this time have been largely or completely removed by the intervening rinses, the choice must be more carefully made so as to avoid harm to the resin.

The existence of alkaline conditions during the last rinse of the resin provides an opportunity for bringing about at this stage in the operation a neutralization of residues of aldehyde. Accordingly, an aldehyde-binding reagent may be used in this last rinse, either in lieu of or in addition to the provision of such reagent in the earlier steeping liquid, the latter being preferred.

The temperature of the rinse liquid is ordinarily low in comparison with that of the steeping liquid and it is not to be expected that the binding of aldehyde residue would proceed at as rapid a pace, or so nearly to completion, in the rinse liquid as in the steeping liquid. That good results are achieved in the final resin by an aldehyde-binding treatment which is not initiated until the final rinse, seems attributable to the continuance of interaction during the subsequent drying at elevated temperature, between the aldehyde-binding reagent persisting on and in the drained resin, and residues of aldehyde, under the alkaline conditions obtaining.

After the final rinse the resin is then dried.

The following examples are given to illustrate specific embodiments of the invention:

*Example I.*—A polyvinyl butyral resin having the following analysis, by weight:

Polyvinyl acetate _____ 0.8
Polyvinyl alcohol _____ 19.3
Polyvinyl butyral _____ 79.9 in freshly precipitated form is slurried with water in the proportion of 45 pounds of the resin to 90 gallons of water. To the slurry is added 1.75 pounds of urea dissolved in about one gallon of water together with sufficient potassium hydroxide to bring the pH of the liquid up to 10.5. The slurry is heated to 75° C., with agitation, and maintained for 3 hours at 75–85° C. with agitation. The pH of the liquid, as indicated by phenolphthalein, is maintained at 10.5 throughout this period by the addition of potassium hydroxide as needed.

With continued stirring the resin is drained as far as feasible without causing agglomeration of the particles, water added to restore the initial volume, and, after 10 minutes of stirring, the resin is drained. Again water is added and the resin drained. Water is then added for the third time having dissolved therein Urea _____lb__ 0.88
Potassium hydroxide, 4N solution_____cc__ 100

The pH of the resulting final rinse liquid remains steady at 8.0 in equilibrium with the resin during stirring for 20 minutes at room temperature.

The resin is now drained and dried on trays by circulation of air at 75° C.

The identical procedure of Example I is carried out except that in place of urea, biuret, acetyl urea, benzoyl urea, diphenyl guanidine, and cetyl betaine are employed in individual runs.

*Example II.*—A polyvinyl butyral resin having the following analysis, by weight:

Per cent
Polyvinyl acetate _____ 1.0
Polyvinyl alcohol _____ 18.9
Polyvinyl butyral _____ 80.1 in freshly precipitated form is slurried with water in the proportion of 45 pounds of resin to 90 gallons of water. To the slurry is added 2.5 pounds of urea dissolved in about one gallon of water also containing sufficient potassium hydroxide to bring the pH of the liquid up to 10.5. The slurry is heated to 75° C., with agitation, and for 3 hours maintained at 75–85° C. with agitation. The pH of the liquid, as indicated by phenolphthalein, is maintained at 10.5 throughout this period by the addition of potassium hydroxide as needed.

With continued stirring the resin is drained as far as feasible without causing agglomeration of the particles, water is added to restore the initial volume, and after ten minutes of stirring, the resin is drained. Again water is added and the resin drained.

Water is added for the third time having dissolved therein 100 cc. of potassium hydroxide, 4N solution. The pH of the resulting final rinse liquid remains steady at 8.0 in equilibrium with the resin during stirring for 20 minutes at room temperature.

The resin is then drained and dried on trays by circulation of air at 75° C.

*Example III.*—A polyvinyl butyral resin having the following analysis, by weight:

Percent
Polyvinyl acetate _____ 0.6
Polyvinyl alcohol _____ 19.8
Polyvinyl butyral _____ 79.6 in freshly precipitated form is slurried with water in the proportion of 45 pounds of resin to 90 gallons of water. Aqueous potassium hydroxide is added until the pH of the liquid is raised to 9.5. It is held at this point while the slurry is heated to 75° C., with agitation, and maintained at 75–85° C. for 3 hours with agitation.

With continued stirring the resin is drained as far as feasible without causing agglomeration of the particles, water is added to restore the initial volume and, after ten minutes of stirring, the resin is drained. Again water is added and the resin drained.

Water is added for the third time having dissolved therein 2.5 pounds of urea and 100 cc. of potassium hydroxide, 4N solution. The pH of the resulting final rinse liquid remains steady at 7.5 in equilibrium with the resin during stirring for 20 minutes at room temperature.

The resin is now drained and then dried on trays by circulation of air at 75° C.

*Example IV.*—A polyvinyl formal resin is prepared by stirring together at 70° C. for 20 hours:

| | Pounds |
|---|---|
| Polyvinyl acetate | 75 |
| Glacial acetic acid | 30 |
| Water | 13 |
| Formalin (38%) | 52 |
| Sulfuric acid (conc.) | 2 |

The reaction mixture is then diluted with 100 pounds of ethyl alcohol and precipitated by the addition of water with thorough agitation. The slurry of precipitated resin is diluted and drained until the content of acetic acid in the liquor has been reduced to less than 1%.

Aqueous sodium hydroxide is added until the pH of the liquor is raised to 10. It is held at this level for 3 hours, with stirring, at a temperature of 95° C. which is higher than the ultimate softening temperature of the resin, i. e., 92° C.

The remainder of the process is carried out as in Example III.

*Example V.*—A procedure analogous to that of Example I is followed with a polyvinyl isobutyral resin except that the treatment with the steeping liquid is conducted at a temperature of 30–90° C. The resin is dried at a temperature of about 80° C.

*Example VI.*—A resin prepared by condensing polyvinyl alcohol and cyclohexanone, having the following analysis, by weight:

| | Percent |
|---|---|
| Polyvinyl acetate | 1.0 |
| Polyvinyl alcohol | 19.0 |
| Polyvinyl ketal | 80.0 | is precipitated from alcohol by admixture with water. The precipitated resin is alternately drained and slurried with water until the concentration of alcohol in the supernatant liquid has been reduced to about 3%, by weight.

The resin is now steeped in water containing sufficient potassium hydroxide to maintain its pH at 9–10, and containing also 5 parts of urea, by weight, per 100 parts of resin. The volume of the liquid is 2 gallons per pound of resin, its temperature is 65° C. and it is maintained in active agitation during about 2.5 hours with the resin. The "hardening" of the resin, i. e., extraction of residual solvent therefrom, is now completed by continuing the treatment for another 30 minutes at 80° C. The slurry is then partially drained while stirring is continued, the volume is replenished by the addition of cold water and the resin then drained more thoroughly down to about 0.8 gallon of liquid per pound. Cold water is added and, after another drain, the resin is stirred in contact with water containing enough potassium hydroxide to maintain its pH at a steady value of 8.5.

The resin is then separated and dried.

The stabilizing treatment, as shown in the examples, is generally applicable to polyvinyl acetals made by condensing an aldehyde with polyvinyl alcohol or with a partially hydrolyzed polyvinyl ester regardless of the specific degree of condensation or the specific degree of hydrolysis of the polyvinyl ester. Obviously, the resin treated must be substantially water insoluble and the hydrolysis of the polyvinyl ester and the condensation of aldehyde with the hydroxyl groups of the polyvinyl compound must be sufficient to give a product that can be fairly considered a polyvinyl acetal resin. The treatment is particularly advantageous with respect to polyvinyl butyrals having about 18% polyvinyl alcohol, by weight, i. e., a polyvinyl alcohol in which about 75% of the hydroxyl groups have been reacted with n-butyraldehyde.

The particle size of the crude resin will depend chiefly upon the manner in which the precipitation of the resin from the solution is conducted. It is desirable that the resin in a batch be of approximately uniform particle size as the time required for stabilization of the batch as a whole is governed by the time required to complete the stabilization of the coarsest particles therein.

The duration of the steeping treatment specified in the examples is for resins of such particle size that the greater part passes a 20-mesh screen and is retained upon an 80-mesh screen. Coarser resins will require correspondingly longer times while finer resins can be stabilized in somewhat shorter times than those specified in the several examples.

It is not material in the ultimate effect what conditions prevail in the rinsing of the resin to leave it with an alkaline substance associated with it in an amount such that the resin is in equilibrium with water of a pH between 7.5 and 11.0. The simplest methods of accomplishing this seem to be to add an alkaline substance to the water in the last rinse or to regulate the rinses so that the requisite amount of alkaline substance absorbed from the steeping liquid, is left in.

While urea is the preferred aldehyde-binding reagent, other water soluble substances such as substituted ureas and analogous compounds may be employed including, in addition to those compounds mentioned in the examples, hexamethylene tetramine, methacrylyl urea, isopropylmethylene urea, and di(ortho toluyl) guanidine.

An advantage of the present invention is that it provides a practical method of removing impurities such as acid catalysts and aldehydes from crude polyvinyl acetal resins without, in itself, contributing any injurious substances to the resin. Further, a refined resin greatly improved in color, clarity, and stability is readily obtained.

As many apparently widely different embodiments of this invention may be made without departing from the spirit and scope thereof, it is to be understood that the invention is not limited to the specific embodiments thereof except as defined in the appended claims.

We claim:
1. Process of treating a crude polyvinyl acetal resin which comprises steeping said resin, in finely divided form, in a steeping liquid comprising essentially an aqueous solution of an alkaline substance from the group consisting of alkali metal hydroxides and tertiary amines, the quantity of said alkaline substance being such as to produce and maintain in said steeping liquid a pH of 7.5–11.0, under active agitation at a temperature adapted to effect softening of the resin particles in said steeping liquid without agglomeration of said particles while subjected to agitation, and subjecting the resin to the action of a water soluble aldehyde-binding reagent from the group consisting of urea, methacrylyl urea, isopropyl-methylene urea, hexamethylenetetramine, and di(ortho tolyl) guanidine while said resin is suspended in an aqueous vehicle having a pH of 7.5–11.0.

2. Process of treating a crude polyvinyl acetal resin which comprises steeping said resin, in finely divided form, in a steeping liquid comprising essentially an aqueous solution of an alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles, while subjected to agitation, and subjecting the resin to the action of urea while said resin is suspended in an aqueous vehicle having a pH of 7.5–11.0.

3. Process of treating a crude polyvinyl butyral resin which comprises steeping said resin, in finely divided form, in a steeping liquid comprising essentially an aqueous solution of an alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles, while subjected to agitation, and subjecting the resin to the action of urea while said resin is suspended in an aqueous vehicle having a pH of 7.5–11.0.

4. Process of treating a crude polyvinyl acetal resin which comprises steeping said resin, in finely divided form, in a steeping liquid comprising essentially an aqueous solution of an aldehyde-binding reagent from the group consisting of urea, methacrylyl urea, isopropyl-methylene urea, hexamethylene-tetramine, and di(ortho tolyl) guanidine and an alkaline substance from the group consisting of alkali metal hydroxide and tertiary amines, the quantity of said alkaline substance being such as to produce and maintain in said steeping liquid a pH of 7.5–11.0, under active agitation at a temperature adapted to effect softening of the resin particles in said steeping liquid without agglomeration of said particles while subjected to agitation.

5. Process of treating a crude polyvinyl acetal resin which comprises steeping said resin, in finely divided form, in a steeping liquid comprising essentially an aqueous solution of urea and an alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles while subjected to agitation.

6. Process of treating a crude polyvinyl butyral resin which comprises steeping said resin, in finely divided form, in a steeping liquid comprising essentially an aqueous solution of urea and an alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles while subjected to agitation.

7. Process of treating a crude polyvinyl acetal resin which comprises steeping said resin, in finely divided form, in a steeping liquid comprising essentially an aqueous solution of an alkaline substance from the group consisting of alkali metal hydroxides and tertiary amines, the quantity of said alkaline substance being such as to produce and maintain in said steeping liquid a pH of 7.5–11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkaline substance is left associated with said resin in such amount that said resin will be in equilibrium with water of a pH between 7.5 and 9.0, said resin being subjected to the action of a water soluble aldehyde-binding reagent from the group consisting of urea, methacrylyl urea, isopropyl-methylene urea, hexamethylenetetramine, and di(ortho tolyl) guanidine at some point during said steeping and rinsing steps when said resin is suspended in an aqueous vehicle having a pH of 7.5–11.0.

8. Process of treating a crude polyvinyl acetal resin which comprises steeping said resin, in finely divided form, in a steeping liquid comprising essentially an aqueous solution of alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkali metal substance is left associated with said resin in such amount that said resin will be in equilibrium with water of a pH between 7.5 and 9.0, said resin being subjected to the action of urea at some point during said steeping and rinsing steps when said resin is suspended in an aqueous vehicle having a pH of 7.5–11.0.

9. Process of treating a crude polyvinyl butyral resin which comprises steeping said resin, in finely divided form, in a steeping liquid comprising essentially an aqueous solution of alkali metal hydroxide, the quantity of said alkali metal hydroxide being such as to produce and maintain in said steeping liquid a pH of 7.5–11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkali metal substance is left associated with said resin in such amount that said resin will be in equilibrium with water of a pH between 7.5 and 9.0, said resin being subjected to the action of urea at some point during said steeping and rinsing steps when said resin is suspended in an aqueous vehicle having a pH of 7.5–11.0.

10. Process of treating a crude polyvinyl acetal resin which comprises steeping said resin, in finely divided form, in a steeping liquid comprising essentially an aqueous solution of an aldehyde-binding reagent from the group consisting of urea, methacrylyl urea, isopropyl-methylene urea, hexamethylene tetramine, and di(ortho tolyl) guanidine and an alkaline substance from the group consisting of alkali metal hydroxides and tertiary amines, the quantity of said alkaline substance being such as to produce and maintain in said steeping liquid a pH of 7.5-11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkaline substance is left associated with said resin in such amount that said resin will be in equilibrium with water of a pH between 7.5 and 9.0.

11. Process of treating a crude polyvinyl acetal resin which comprises steeping said resin, in finely divided form, in a steeping liquid comprising essentially an aqueous solution of urea and an alkali metal hydroxide, the quantity of said alkali metal hydroxide being such as to produce and maintain in said steeping liquid a pH of 7.5-11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkali metal substance is left associated with said resin in such amount that said resin will be in equilibrium with water of a pH between 7.5 and 9.0.

12. Process of treating a crude polyvinyl butyral resin which comprises steeping said resin, in finely divided form, in a steeping liquid comprising essentially an aqueous solution of urea and an alkali metal hydroxide, the quantity of said alkali metal hydroxide being such as to produce and maintain in said steeping liquid a pH of 7.5-11.0, under active agitation at a temperature adapted to effect softening of the resin particles in said steeping liquid without agglomeration of said particles while subjected to agitation, and thereafter rinsing said resin with water, the conditions of said rinsing being such that a residue of an alkali metal substance is left associated with said resin in such amount that said resin will be in equilibrium with water of a pH between 7.5 and 9.0.

BOZETECH C. BREN.
JOHN H. HOPKINS.
GEORGE H. WILDER.